US007970152B2

(12) United States Patent
Fischer et al.

(10) Patent No.: US 7,970,152 B2
(45) Date of Patent: Jun. 28, 2011

(54) METHOD AND DEVICE FOR MATCHING THE PHASES OF MICROPHONE SIGNALS OF A DIRECTIONAL MICROPHONE OF A HEARING AID

(75) Inventors: Eghart Fischer, Schwabach (DE); Henning Puder, Erlangen (DE)

(73) Assignee: Siemens Audiologische Technik GmbH, Erlangen (DE)

( * ) Notice: Subject to any disclaimer, the term of this patent is extended or adjusted under 35 U.S.C. 154(b) by 42 days.

(21) Appl. No.: 12/509,647

(22) Filed: Jul. 27, 2009

(65) Prior Publication Data

US 2009/0285423 A1 Nov. 19, 2009

Related U.S. Application Data

(62) Division of application No. 11/070,496, filed on Mar. 2, 2005, now Pat. No. 7,587,058.

(30) Foreign Application Priority Data

Mar. 5, 2004 (DE) ......................... 10 2004 010 867

(51) Int. Cl.
*H04B 3/00* (2006.01)
*H04R 1/40* (2006.01)
*H04R 25/00* (2006.01)

(52) U.S. Cl. ............. 381/92; 381/97; 381/313; 381/356

(58) Field of Classification Search ................. 381/23.1, 381/26, 91, 92, 97, 113, 122, 313, 356, 357
See application file for complete search history.

(56) References Cited

U.S. PATENT DOCUMENTS

| | | | | |
|---|---|---|---|---|
| 5,029,215 | A * | 7/1991 | Miller, II | 381/92 |
| 5,325,436 | A * | 6/1994 | Soli et al. | 381/313 |
| 6,272,229 | B1 | 8/2001 | Backgaard | |
| 6,421,448 | B1 | 7/2002 | Arndt et al. | |
| 2001/0028718 | A1* | 10/2001 | Hou | 381/92 |
| 2002/0034310 | A1 | 3/2002 | Hou | |
| 2002/0041696 | A1 | 4/2002 | Jensen | |
| 2002/0176587 | A1 | 11/2002 | Roeck | |
| 2004/0081327 | A1* | 4/2004 | Jensen | 381/313 |
| 2004/0240683 | A1* | 12/2004 | Niederdrank | 381/92 |

FOREIGN PATENT DOCUMENTS

| | | | |
|---|---|---|---|
| DE | 19849739 | A1 | 5/2000 |
| DE | 19918883 | C1 | 11/2000 |
| EP | 0982971 | A2 | 3/2000 |
| WO | 0110169 | A1 | 2/2001 |
| WO | 0200248 | A2 | 1/2002 |
| WO | WO 0230150 | A2 | 4/2002 |

* cited by examiner

*Primary Examiner* — Curtis Kuntz
*Assistant Examiner* — Jesse A Elbin

(57) ABSTRACT

The phase differences of microphones of a hearing aid microphone are to be reduced. To do this, the level of an output signal of a directional microphone is compared with an omnidirectional signal. If the level of the output signal of the differential directional microphone is above the level of the omnidirectional signal, this level difference is minimized by an adaptive, frequency-selective transit time compensation in individual frequency bands and phase matching of the microphones is thus achieved. By means of an alternative method, microphone matching is achieved in that the measurable delay of the two microphone signals is adaptively limited in individual frequency bands to a maximum value corresponding to the sound transit time between the microphones. Phase matching without knowing the position of a sound source can thus be achieved.

5 Claims, 6 Drawing Sheets

METHOD AND DEVICE FOR MATCHING THE PHASES OF MICROPHONE SIGNALS OF A DIRECTIONAL MICROPHONE OF A HEARING AID

CROSS REFERENCE TO RELATED APPLICATIONS

This application is a divisional of U.S. application Ser. No. 11/070,496 filed Mar. 2, 2005 now U.S. Pat. No. 7,587,058. This application claims priority to the German application No. 10 2004 010 867.6, filed Mar. 5, 2004. All of the applications are incorporated by reference herein in its entirety.

FIELD OF INVENTION

The invention relates to a method for matching the phases of microphones of a directional microphone of a hearing aid. Furthermore, the invention relates to a corresponding device for matching the phases.

BACKGROUND OF INVENTION

The directional effect of differential multi-microphone systems depends decisively on how well the particular microphones used are matched with regard to amplitude and phase response. Only when the incoming microphone signals are amplified and delayed equally relative to frequency can the subsequent differential forming of the microphone signals generate a precise cancellation in one or more directions (spatial notches).

As a solution for equalizing amplitude frequency responses, it is known to match the amplitudes of the microphones used to one of the microphones, designated as the reference microphone. The amplification factors required to match/adjust the microphones are calculated by quotient formation of the time-averaged amplitudes of the microphone signals and of the reference microphone signals.

SUMMARY OF INVENTION

As yet no simple solution is known to the problem of equalizing the microphone phase differences that (when considered in sufficiently narrow frequency bands) can be interpreted as transit time differences of the signals of the microphones under consideration. The reason for this is that transit time differences also arise due to the different positions of sound sources relative to the microphone position. With differential directional microphones they are used determinedly to cancel sounds from certain directions of incident. The problem of developing a method for calculating the phase compensation is that it is at for the moment not possible to determine whether signals with different delays are due to phase mismatch or phase delay or to differences of the source from the individual microphones. A simple transit time compensation is therefore not a suitable solution to the problem. To do this, it is necessary to know the position of the source. If this is not the case, there is a risk that signals from directions (e.g. from the front) that one wishes to receive are cancelled by the transit time equalization.

The result is that precisely preselected microphone pairs or triplets are/have to be used to guarantee good directional effect properties.

These problem is again illustrated by means of FIGS. 1-3. The left part of FIG. 1 shows a speaker L that applies sound to two microphones M1 and M2 in front. Microphone M1 supplies an output signal x1. The output signal of the second microphone M2 is delayed by ΔT due to the structure, so that an output signal x2 results. The same signals x1 and x2 are received by the arrangement in the right half of FIG. 1. Because speaker L is further away from the second microphone M2, the signal x2 has a delay or phase difference compared with signal x1 due to the transit time between microphone M1 and microphone M2. A phase matching or delay matching of both microphones is thus not possible if the position of the speaker is not known.

FIG. 2 shows a simplified signal processing of a directional microphone. Output signals x1 and x2 of microphones M1 and M2 first undergo directional processing DV and then compensation K, with which the amplitude frequency response of the directional processing DV is compensated. Thus, a flat amplitude frequency response of the output signal Y of the directional microphone is obtained, especially for the 0° direction.

If, however, the microphones are not matched to each other, a phase error PF or a transit time difference ΔT between the output signals x1 and x2 of both microphones M1 and M2 occurs as shown in FIG. 3. After directional processing DV and fixed compensation K, an output signal Y' of the directional microphone is thus produced. The compensation K for unmatched microphones is, however, insufficient if the transit time error ΔT results in an overall delay that is greater than the maximum delay caused by the microphone distance.

Up to now, preselected microphones, the phase difference of which is very small or zero, were used for this reason. If this was not possible, a phase matching was carried out with the position of the calibration source being known.

In accordance with an internally-known method, a phase matching of two microphones is achieved in that the complex transmission functions from a microphone model for determining the microphone output signals is taken into account. Furthermore, from publication U.S. Pat. No. 6,272,229, the separation of linear phase differences from non-linear and the assignment of the non-linear ones to the microphone is known.

The named methods are, however, either too expensive or require knowledge of the position of the sound source.

An object of this invention is therefore to achieve an effective phase matching for a directional microphone without knowing the position of the sound source.

This object is achieved in accordance with the invention by a method for matching the phases of microphones of a hearing aid directional microphone to each other by measuring or specifying a first level of an omnidirectional signal of the directional microphone, measuring a second level of a directional signal of the directional microphone and matching the second level to the first level by changing the transit time of an output signal from one of the microphones of the directional microphone without taking account of positional information regarding a sound source.

Furthermore, this invention provides for a suitable device for matching the phases of microphones of a hearing aid directional microphone to each other with a measuring device for measuring or presetting a first level of an omnidirectional signal of the directional microphone and for measuring a second level of a directional signal of the directional microphone and for a matching device for matching the second level to the first level by changing the transit time of an output signal from one of the microphones of the directional microphone without taking account of positional information regarding a sound source.

Furthermore, the aforementioned objective is achieved by a method for matching the phases of microphones of a hearing aid directional microphone to each other by specifying a maximum transit time difference between a first output signal of a first microphone and a second output signal of a second microphone of the directional microphone, measuring an actual transit time difference between the two output signals and delaying one of the two output signals so that the actual transit time difference is not greater than the maximum transit time difference.

Accordingly, a device for matching the phases of microphones of a hearing aid directional microphone to each other is provided with a providing device for providing a maximum transit time difference between a first output signal of a first microphone and a second output signal of a second microphone of the directional microphone, a measuring device for measuring an actual transit time difference between the two output signals and a delay device for delaying one of the two output signals, so that the actual transit time difference is not greater than the maximum transit time difference.

Preferably, the matching of the microphone phases is achieved by determining the difference between the first level of the omnidirectional signal and the second level of the directional signal and minimizing this difference. The advantage of this is that the level difference can be easily determined, so that phase matching can be readily carried out.

In a further preferred embodiment of the invention, it is determined, during the matching, whether the second level is higher than the first level and the transit time of the output signal from one of the microphones is then changed only if the second level is higher than the first level. This utilizes the knowledge that if there is a mismatch of the microphones of a directional microphone the output level is increased with respect to an omnidirectional signal.

Advantageously, the maximum transit time difference is specified as the sound transit time from the first to the second microphone. The individual positioning of the microphones in the hearing aid can thus be precisely allowed for.

The value of the maximum transit time difference can be provided in a special memory. This memory can also be written to as required, so that the circuit for phase matching can be used for any microphone distances.

It is particularly preferred if the method in accordance with the invention is repeated several times. In this way, optimum phase matching can take place in several steps without knowing the position of the particular sound source.

BRIEF DESCRIPTION OF THE DRAWINGS

The invention is explained in more detail with the aid of the accompanying drawings. These are as follows.

For a better understanding of the invention, the directional characteristics of differential directional microphones should first be explained with the aid of FIGS. 4 and 5.

Figure 4:
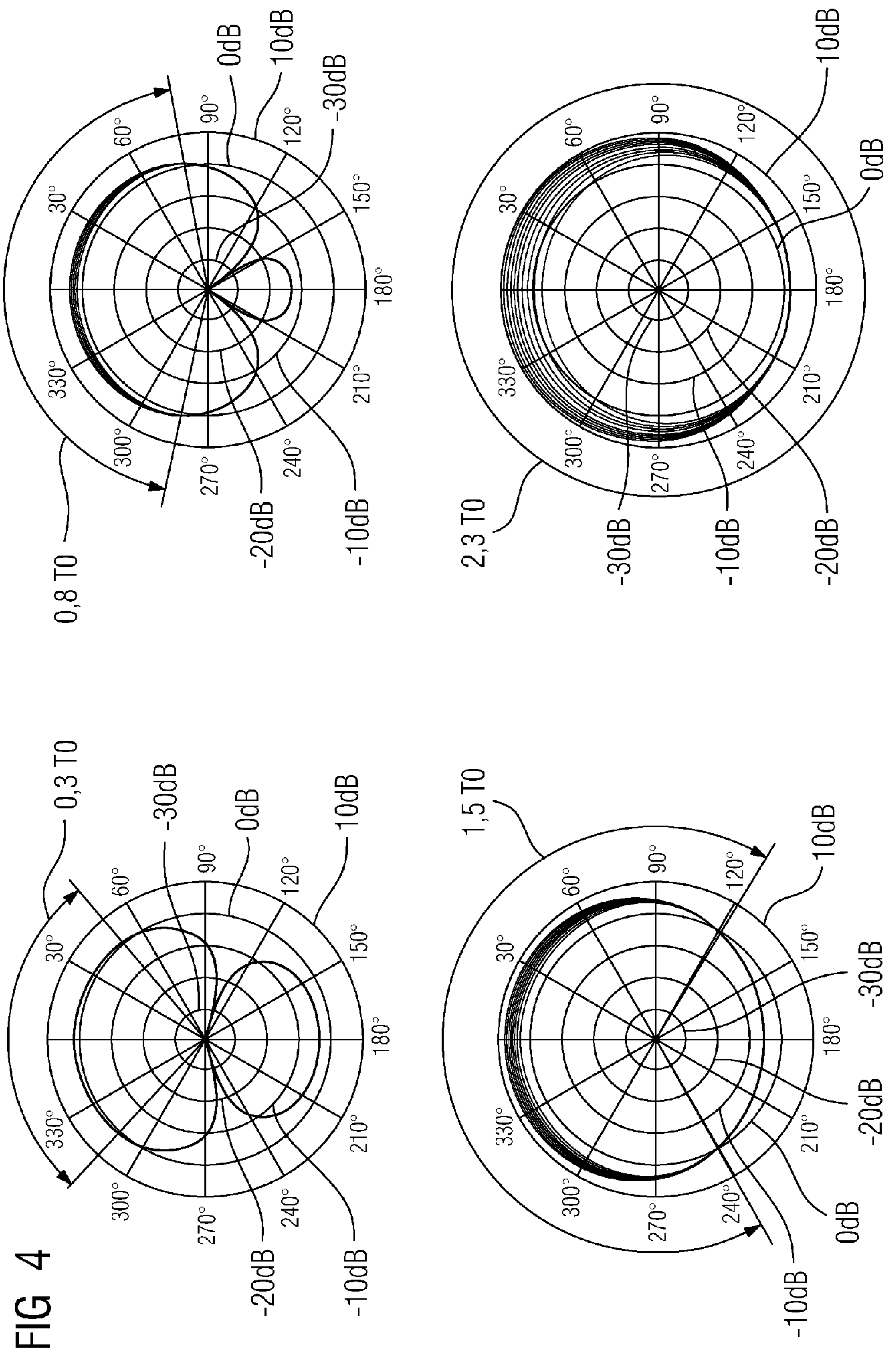
FIG. 4 shows several directional diagrams that result from different transit time delays of microphones of the directional microphone. In the top left of FIG. 4, a directional diagram is shown that enables a transit time difference or phase delay of the microphone signals relative to each other of 0.3 T0 to be measured, whereby T0 corresponds to the transit time of the sound from one microphone to the other. The 0 dB line in the polar diagram corresponds to the omnidirectional signal. An ideal directional diagram of a differential directional microphone would have the shape of an 8. Because of the phase difference between the two microphones due to the transit time, the 8 shape is somewhat deformed. The directional curve intersects the 0 dB line at approximately 45° and 315°. In the range between 315° and 45°, shown by a double arrow, the level of the directional microphone is above the 0 dB line, i.e. above the level of the omnidirectional microphone.

If the phase transit time between the microphone signals is 0.8 T0, this further deforms the directional diagram of the directional microphone, as shown in the top right hand of FIG. 4. The range in which the directional signal is higher than the omnidirectional signal in this case is between approximately 285° and 75°. At a phase delay or transit time difference of 1.5 T0, this range is between approximately 240° and 120°, as shown in the picture in the bottom left of FIG. 4. At a transit time difference of 2.3 T0, the directional signal is always above the omnidirectional signal, as shown by a circumference circle in the bottom right direction diagram of FIG. 4.

Figure 5:
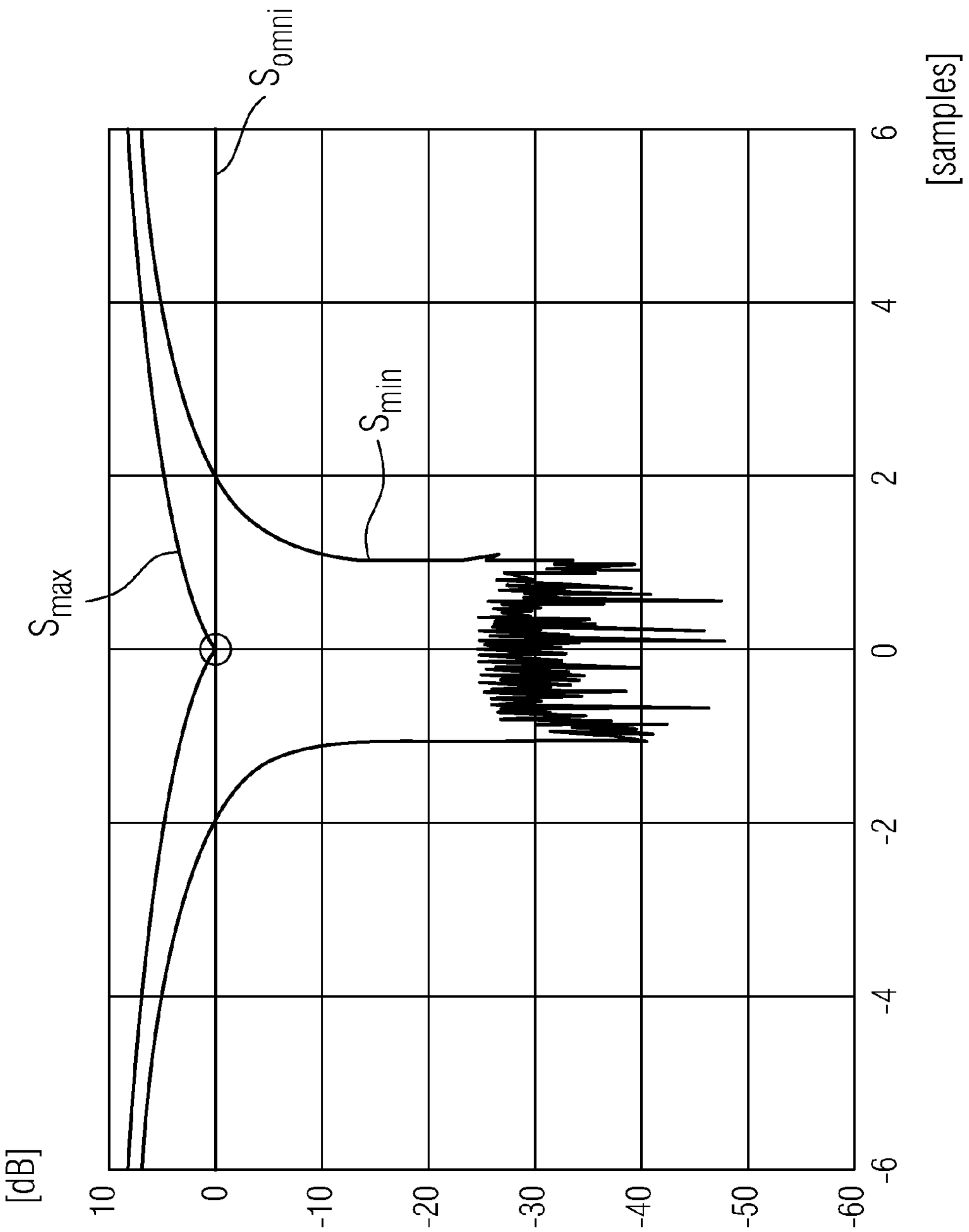

The diagram in FIG. 5 shows the minimum and maximum directional signals $S_{min}$ and $S_{max}$ relative to the phase shift. Furthermore, the signal of an omnidirectional microphone $S_{omni}$ is shown on the 0 dB line.

With an ideal directional microphone where there is no transit time difference between the microphones, i.e. where the phase delay is 0, the maximum signal is at 0 dB and thus corresponds to the omnidirectional signal. The minimum signal is very low and is below −30 dB. The greater the transit time difference between the two microphones, i.e. the higher the phase difference measured in samples, the higher the minimum directional signal 5 min and maximum directional signal $S_{max}$. It can also be seen that above a phase delay of approximately two samples the directional signals $S_{min}$ and $S_{max}$ are above the 0 dB line, as was already explained for the concrete phase delay of 2.3 T0 in the bottom right hand directional diagram of FIG. 4.

If the level of the directional signal $S_{max}$ deviates from the omnidirectional signal $S_{omni}$, this is an indication that the microphone output signals have a phase difference. This fact can be utilized to match the phases of the two microphone signals.

In accordance with the first form of embodiment of this invention, a check is therefore made to determine whether the level of the output signal of the differential directional microphone is above that of the omnidirectional signal. If this is the case, this level difference is minimized by an adaptive, frequency-selective transit time compensation in individual frequency bands and a phase matching of the microphones is thus achieved. An ideal matching is possible if the signal waves are in the 0° direction relative to the microphone at some time during the matching. In this situation the increase in the output signal of the differential directional microphone is greatest compared to the omnidirectional signal, because the directional signal then corresponds to the signal $S_{max}$ shown in FIG. 5 (see also directional diagram in FIG. 4 above).

Figure 1:
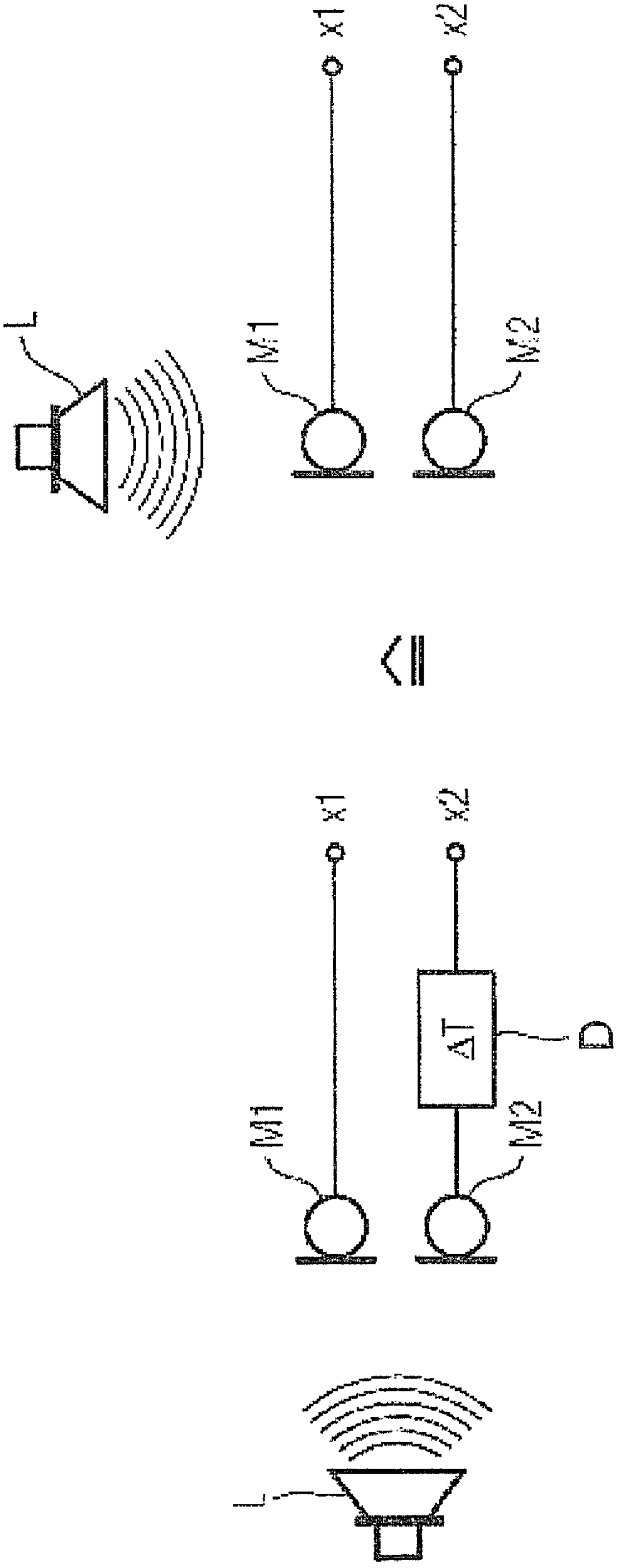
FIG. 1 A sketch showing the principle of generation of microphone signals
Figure 2:
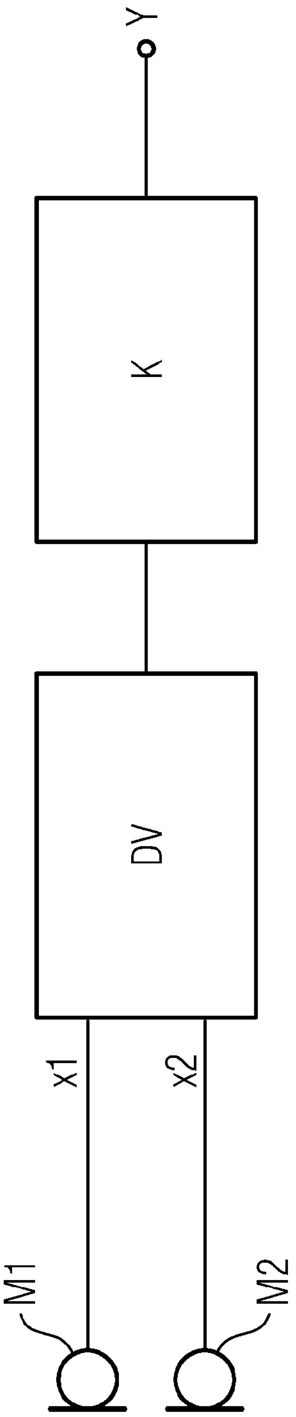
FIG. 2 A circuit diagram of a directional microphone
Figure 3:
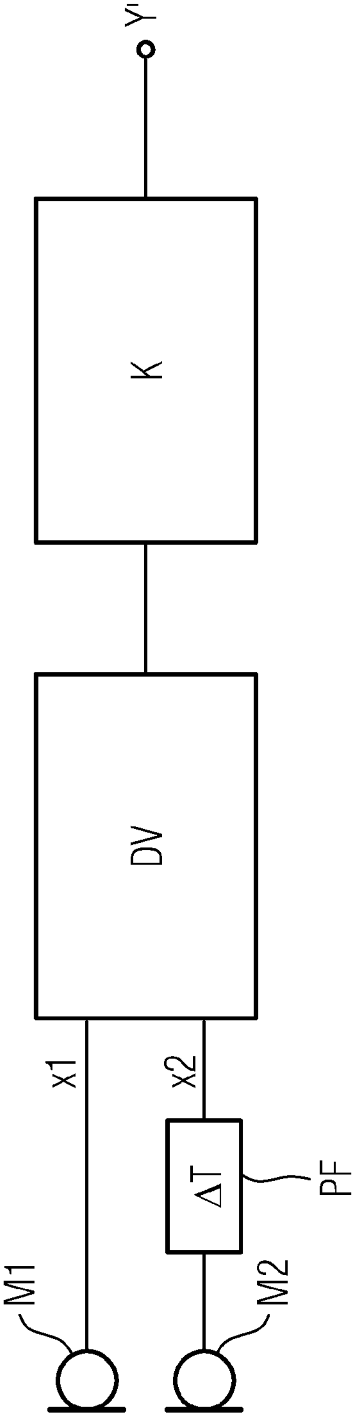
FIG. 3 A circuit diagram of a directional microphone with microphones that have a phase difference FIG. 4 A directional diagram of a directional microphone, the microphones of which have a phase difference FIG. 5 A direction characteristic relative to the phase difference of the microphone signals FIG. 6 A circuit diagram showing the matching circuits in accordance with a first form of embodiment FIG. 7 A circuit diagram showing a matching circuit in accordance with a second form of embodiment The following exemplary embodiments, described in more detail, represent preferred forms of embodiment of the invention.
Figure 6:
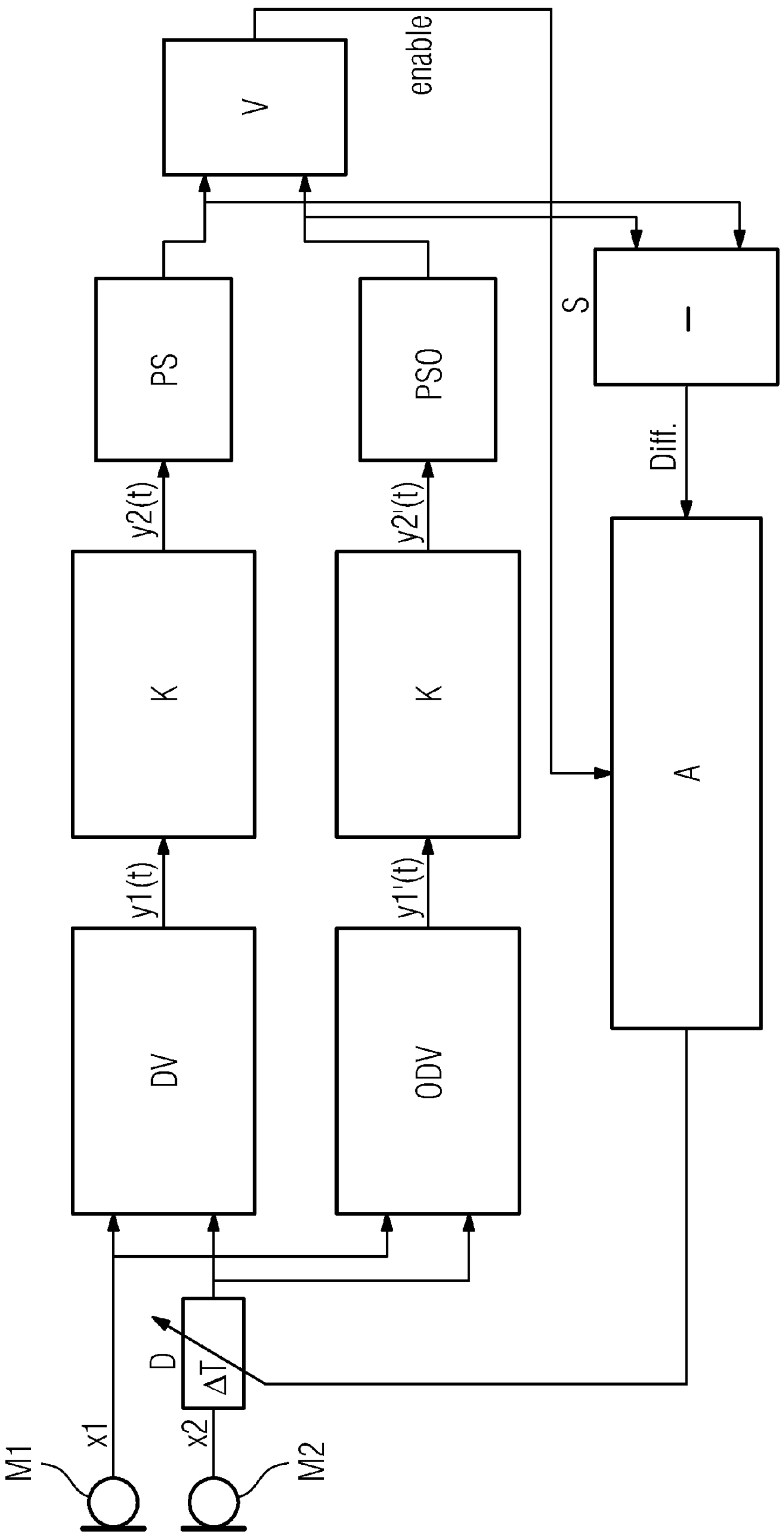

A circuit diagram showing the principle of this method is shown in FIG. 6. The microphone output signals x1 and x2 of microphones M1 and M2 are first subjected to a directional processing DV corresponding to the principle in FIG. 2. During this process, the output signal X2 is delayed by the delay unit D for phase matching by the transit time ΔT. In the example chosen, the directional processing DV takes place corresponding to the formula $$y1(t)=x1(t)-x2(t-T0)+a[x1(t-T0)-x2(t)].$$

whereby T0 is the sound transit time between the two microphones and a is an adaptive control parameter.

The output signal y1($t$) of the directional processing DV is compensated in the compensator K corresponding to the formula $$y2(t)=y1(t)+y2(t-2*T0)$$

in order to achieve an even frequency response. The level is now estimated from the output signal y2($t$) in a level estimation unit PS.

In parallel with this, the microphone signals are subjected to omnidirectional processing ODV according to the following formula $$y1'(t)=x1(t)-x1(t-T0)+[x2(t)-x2(t-T0)]$$

The output signal y1'(t) of the omnidirectional processing ODV is in turn compensated in a compensator K corresponding to the formula $$y2'(t)=y1'(t)+y2(t-2*T0)$$

The level of the resulting signal y2'(t) is then also estimated by a level estimation unit PSO.

The two estimated levels are compared with one another in a comparison unit V. If the level of the directional signal is greater than that of the omnidirectional signal, an enable signal is generated by means of which a phase matching is activated in a matching unit A. The level difference between the two estimated levels determined with the aid of a subtractor is a further input signal to the matching unit A. From this, a suitable new transit time difference ΔT is specified in the matching unit A and is transmitted to the delay unit D.

In a matching phase, usually at the start of use of a hearing aid or when the hearing aid is reset, the matching control circuit shown in FIG. 6 is run through several times. In this way, the phase difference between the two microphone signals can be reduced to zero step-by-step. This method, however, has the disadvantage that where there is microphone noise that superimposes on the incidental signals it can cause changes in the level of the calculated signals to occur that could impair the achievable phase matching.

For this reason, a second method in accordance with a second form of embodiment of the invention is provided for phase matching. This second method is based on the concept that where the level of the differential directional microphone is above the level of the omnidirectional signal, the microphones have a transit time difference in individual frequency bands that is greater than the physically possible sound transit time between the microphones, that is determined by the microphone distance. It is therefore possible to also achieve microphone matching by adaptively limiting the measurable delay of both microphone signals in individual frequency bands to this physically possible value. An ideal matching can thus be achieved not later than when a signal from the 0° direction arrives.

Figure 7:
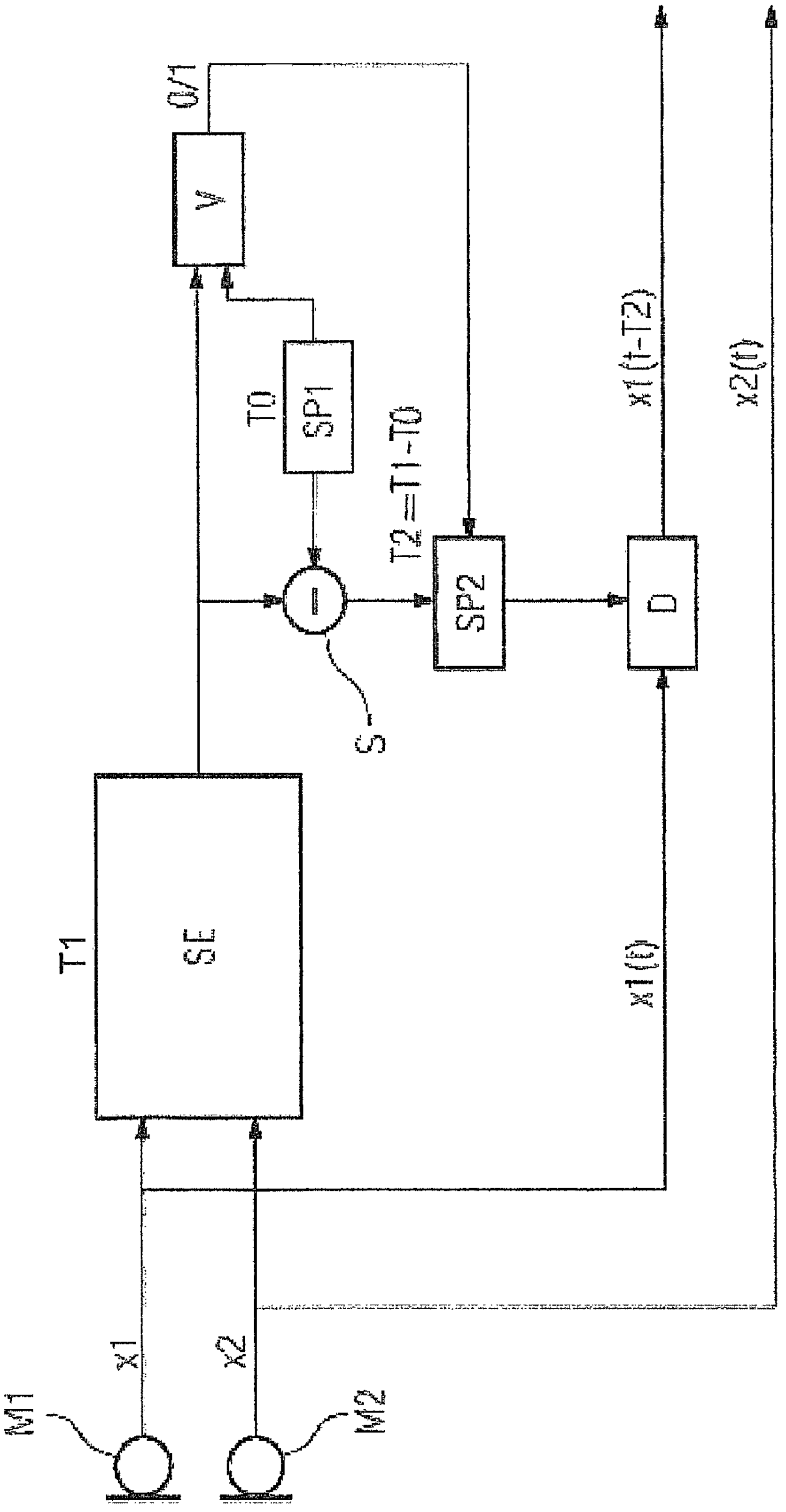

A circuit diagram showing the principle of these two methods is shown in FIG. 7. The transit time difference T1 between the output signal x1 of microphone M1 and the output signal x2 of the microphone M2 is first estimated in an estimation unit SE. The estimated transit time T1 is compared in a comparison unit V with a maximum possible transit time T0 stored in a memory SP1. This maximum possible transit time T0 in turn corresponds to the sound transit time between the two microphones. At the same, the difference between the estimated transit time T1 and the maximum possible transit time T0 is determined in a subtractor S by forming a differential transit time T2. If the estimated transit time T1 is greater than the maximum possible transit time T0, the comparison unit V outputs an enable signal to a memory SP2, that stores the differential transit time T2 received from the subtractor S. The transit time T2 stored in the memory SP2 is used in the delay element D to delay the output signal x1. Thus, delay-compensated output signals x1($t$-T2) and x2($t$) can be provided.

A check is always carried out in the matching phase to determine whether the actual transit time T1 is greater than the maximum transit time T0. An optimum matching is then achieved if the sound from the 0° direction arrives at any time point. The transit times then determined are no longer greater than the maximum possible transit time T0 and the matching can thus be ended.

The invention thus enables, adaptively and without knowledge of the position of the source(s), the phase of the microphones to be matched, particularly in the form of adjustable delays in sufficiently narrow frequency bands. It is thus possible to position "ideal" notches in the directional characteristic at certain incidence directions and at the same time make sure that signals from the required incidence direction (e.g. 0° direction) are not attenuated or distorted. A precondition for this is that a predominant signal is present from the 0° direction for a time period which is sufficiently long for the adaption. The time point at which this is the case need not be known to the method. The adaption is, however, not completed until this signal is present.

This design therefore means that it is not necessary to use pre-selected microphones, and this has an economic advantage. A particular advantage is also that phase difference that arises due to effects on the head of a hearing aid carrier and the directive effect, including with an ideally-matched microphone triplet, can be massively limited (particularly with differential directional microphones of the second order, where three microphones are used), can also be compensated for with the method presented here. In addition, better directional effects are to be expected where the directional microphones are used on the head.

The invention claimed is:

1. A method of matching the phases of microphone signals of a directional microphone having a first and a second microphone unit, the directional microphone sized and configured for use with a hearing aid, the method comprising:

prescribing a maximum delay difference between a first output signal associated with a first signal level of an omnidirectional microphone signal provided by the first microphone unit and a second output signal associated with a second signal level of a directional microphone signal provided by the second microphone unit;

measuring a current delay difference between the first and second output signals; and delaying the first or the second output signal so that the current delay difference after the delaying at most equals the maximum delay difference wherein the delay of either the first or the second output signal is adjusted only if the second signal level is higher than the first signal level.

2. The method according to claim 1, wherein the maximum delay difference is a transit time calculated for an acoustic signal traveling from the first to the second microphone unit.

3. The method according to claim 1, wherein the maximum delay difference is stored in a memory unit.

4. The method according to claim 1, wherein the maximum delay difference is determined by a first processing unit, the current delay difference is calculated by a measuring device, and the delaying of the first or the second output signal is conducted by a second processing unit.

5. The method according to claim 1, wherein the steps of the method are repeated.

* * * * *